US011777285B2

(12) United States Patent
Smith

(10) Patent No.: US 11,777,285 B2
(45) Date of Patent: Oct. 3, 2023

(54) CABLE PULLER

(71) Applicant: Current Tools, Inc., Greenville, SC (US)

(72) Inventor: Michael R. Smith, Easley, SC (US)

(73) Assignee: Current Tools, Inc., Greenville, SC (US)

( * ) Notice: Subject to any disclaimer, the term of this patent is extended or adjusted under 35 U.S.C. 154(b) by 1024 days.

(21) Appl. No.: 16/568,922

(22) Filed: Sep. 12, 2019

(65) Prior Publication Data

US 2020/0091690 A1    Mar. 19, 2020

Related U.S. Application Data

(60) Provisional application No. 62/731,436, filed on Sep. 14, 2018.

(51) Int. Cl.
*H02G 1/08* (2006.01)
*B66D 1/28* (2006.01)
*B66D 1/74* (2006.01)
*H02G 1/06* (2006.01)

(52) U.S. Cl.
CPC ............. *H02G 1/085* (2013.01); *H02G 1/06* (2013.01); *H02G 1/081* (2013.01)

(58) Field of Classification Search
CPC ............ H02G 1/08; H02G 1/085; H02G 1/06; H02G 1/081; H02G 1/00
USPC ................................................ 254/134.3 FT
See application file for complete search history.

(56) References Cited

U.S. PATENT DOCUMENTS

| | | | |
|---|---|---|---|
| 8,246,009 B2 * | 8/2012 | Plummer | H02G 1/08 254/134.3 R |
| 2005/0051759 A1 * | 3/2005 | Plummer | B66D 1/7447 254/134.3 FT |
| 2007/0284559 A1 * | 12/2007 | Plummer | H02G 1/08 254/134.3 FT |
| 2013/0240807 A1 * | 9/2013 | Radle | H02G 1/06 254/134.3 FT |
| 2014/0131645 A1 * | 5/2014 | Jordan | H02G 1/085 254/134.3 R |
| 2016/0261097 A1 * | 9/2016 | Smith | H02G 1/08 |
| 2018/0191141 A1 * | 7/2018 | Schmidt | H02G 1/085 |
| 2019/0245331 A1 * | 8/2019 | Palmer | H02G 1/081 |
| 2021/0362988 A1 * | 11/2021 | Jubeck | B66D 1/7447 |
| 2022/0068117 A1 * | 3/2022 | Marben | H02G 1/08 |
| 2022/0069553 A1 * | 3/2022 | Marben | H04B 17/318 |

OTHER PUBLICATIONS

66_MobileCablePuller (Year: 2019).*
66-mobile-cable-puller-6000-catalog (Year: 2022).*

* cited by examiner

*Primary Examiner* — Mahdi H Nejad
(74) *Attorney, Agent, or Firm* — Dority & Manning, P.A.

(57) ABSTRACT

Cable pullers are provided. A cable puller includes a frame, and a boom assembly rotatably connected to the frame. The boom assembly includes a drive assembly, a first arm extending in a first direction from the drive assembly, a second arm extending in a second opposite direction from the drive assembly, and a third arm rotatably connected to the second arm. Rotation of the boom assembly relative to the frame causes rotation of the third arm relative to the second arm to a position wherein a longitudinal axis of the third arm is parallel with a longitudinal axis of the second arm.

21 Claims, 15 Drawing Sheets

CABLE PULLER

CROSS-REFERENCE TO RELATED APPLICATIONS

The present application claims priority to U.S. Provisional Patent Application Ser. No. 62/731,436, filed on Sep. 14, 2018, the disclosure of which is incorporated by reference herein in its entirety.

FIELD OF THE INVENTION

The present disclosure relates generally to cable pullers for pulling cable through conduits. In particular, the present disclosure relates generally to cable pullers with improved rotational features.

BACKGROUND OF THE INVENTION

Cable pullers in general are well-known devices for pulling power cables, data cables, or other wiring (collectively referred to as "cable") through conduits such as building conduits. A cable puller typically includes a capstan and a motor which powers and rotates the capstan. The cable or a rope tied to the cable is wound around and tails off the capstan during operation. The capstan thus generally acts as a force multiplier during operation. Use of the cable puller to pull the cable through the conduit allows a user of the cable puller to exert only a small force on the cable and/or rope. This relatively small force is translated into a large force of several thousand pounds which is exerted on the cable and/or rope and which provides enough force on the cable and/or rope to pull the cable through the conduit.

Examples of known cable pullers are provided in, for example, U.S. Pat. No. 8,434,741 to Radle et al. entitled "Powered Cable Puller"; U.S. Pat. No. 8,246,009 to Plummer entitled "Cable Puller with Pivot Adjuster for Converting Between Upward and Downward Cable Pulling"; U.S. Pat. No. 8,016,267 to Jordan et al. entitled "Wire Puller and Conduit Adapter"; U.S. Pat. No. 7,070,168 to Plummer entitled "Cable Puller Adapter"; and U.S. Patent Application Publication No. 2014/0131645 to Jordan et al. entitled "Wire or Rope Puller", all of which are incorporated by reference herein in their entireties.

One constant concern with cable pullers is the flexibility of the cable pullers. For example, in many cases, cable pullers must fit within and move around in small spaces to access the conduits through which cable must be pulled. Some known cable pullers have partially addressed these concerns by having features which facilitate pivotal movement of various components, such as conduit-engagement devices on the ends of the cable pullers, about horizontal axes. These features allow the cable pullers to access conduits at different heights and perform both "down-pull" and "up-pull" procedures. However, further and additional cable puller flexibility is desired.

Accordingly, improved cable pullers are desired in the art. In particular, cable pullers with improved rotational features would be advantageous.

BRIEF DESCRIPTION

Aspects and advantages of the cable pullers in accordance with the present disclosure will be set forth in part in the following description, or may be obvious from the description, or may be learned through practice of the technology.

In accordance with one embodiment, a cable puller is provided. The cable puller includes a frame, and a boom assembly rotatably connected to the frame. The boom assembly includes a drive assembly, a first arm extending in a first direction from the drive assembly, a second arm extending in a second opposite direction from the drive assembly, and a third arm rotatably connected to the second arm. Rotation of the boom assembly relative to the frame causes rotation of the third arm relative to the second arm to a position wherein a longitudinal axis of the third arm is parallel with a longitudinal axis of the second arm.

In accordance with another embodiment, a cable puller is provided. The cable puller includes a frame, the frame including a base and a vertical member extending therefrom. The cable puller further includes a strike plate mounted to the base. The cable puller further includes a boom assembly rotatably connected to the vertical member. The boom assembly includes a drive assembly, a first arm extending in a first direction from the drive assembly, and a second arm extending in a second opposite direction from the drive assembly, a third arm rotatably connected to the second arm, and a fourth arm rotatably connected to the third arm by a joint assembly. Rotation of the boom assembly relative to the frame causes the joint assembly to contact the strike plate. Such contact causes rotation of the third arm relative to the second arm to a position wherein a longitudinal axis of the third arm is parallel with a longitudinal axis of the second arm.

These and other features, aspects and advantages of the present cable pullers will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present cable pullers, including the best mode of making and using the present systems and methods, directed to one of ordinary skill in the art, is set forth in the specification, which makes reference to the appended figures, in which.

DETAILED DESCRIPTION OF THE INVENTION

Figure 1:
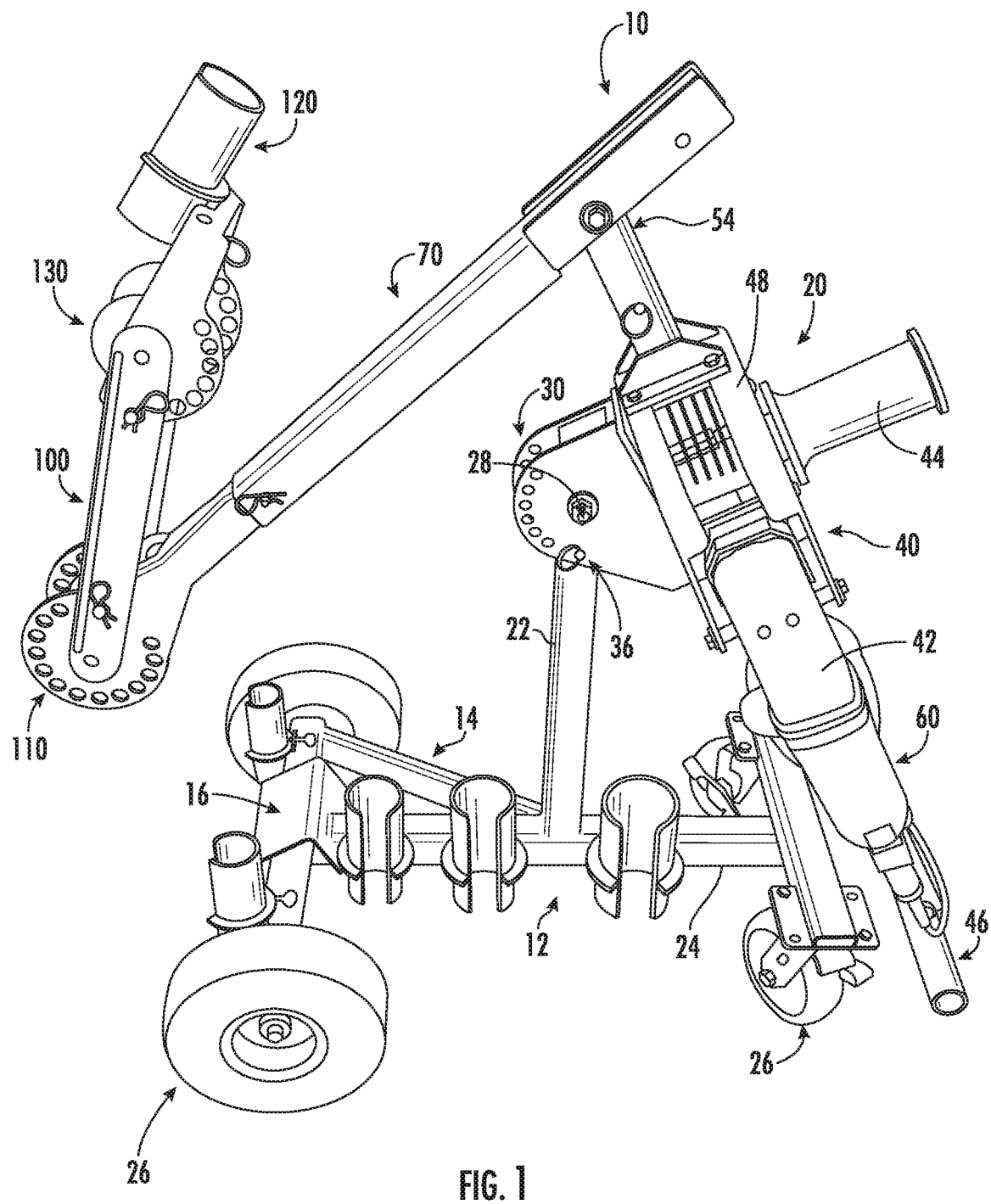
FIG. 1 is a side perspective view of a cable puller in a transport position in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to FIGS. 1 through 15, the present disclosure is directed to improved cable pullers 10 which advantageously provide improved rotational features. A cable puller 10 in accordance with the present disclosure may include a frame 12 which includes a base 14 and a vertical member 22 extending therefrom. The base 14 may include a plurality of horizontal members 24. Base 14 may accommodate a plurality of wheels 26, such as casters and/or tires, which are connected thereto.

A strike plate 16 may be mounted to the base 14, such as to one of the horizontal members 24. Strike plate 16 may be disposed at an angle 18 between horizontal and vertical.

A cable puller 10 in accordance with the present disclosure may include a boom assembly 20 rotatably connected to the vertical member 22 such that the boom assembly 20 is rotatable about an axis 28 that is transverse to the vertical member 22 (for example, horizontal).

Boom assembly 20 may include a bracket assembly 30 which is rotatably coupled to the vertical member 22 to facilitate such rotation. Bracket assembly 30 may include one or more bracket plates 32. A bracket plate 32 may include a plurality of bore holes 34 defined therein. A pin 36 may be extended through a bore hole 34 of the plurality of bore holes 34, and through a bore hole defined in the vertical member 22, to lock the position of the bracket assembly 30 in a desired rotational position. Removal of the pin 36 may permit rotation.

Boom assembly 20 may further include a drive assembly 40 which is mounted to the bracket assembly 30. Drive assembly 40 may include a motor 42, a capstan 44, and a handle 46. Drive assembly 40 may further include a drive frame 48, and boom assembly 20 may include a first arm 50 extending in a first direction from the assembly 40, such as from the drive frame 48. The drive frame 48 may be fixedly connected to the bracket assembly 30. The first arm 50 may be fixedly connected to the drive frame 48. Boom assembly 20 may further include a second arm 54, which may be shorter than the first arm 50, which may extend from the drive frame 48 in a second direction opposite to the first direction. The second arm 54 may be fixedly connected to the drive frame 48. The handle 46 may be disposed at a distal end 52 of the first arm 50 (i.e. a distal end 52 from the drive frame 48). The handle 46 may be rotatable relative to the first arm 50, such as about an axis 56 which is transverse to a longitudinal axis 51 of the first arm 50. The motor 42 may be a component of an actuator 60, such as a power drill, which is mounted in the drive assembly 40, such as to the drive frame 48 and/or to the first arm 50. Examples of such actuators 60 and drive arrangements are provided in U.S. Pat. Nos. 6,286,815; 6,682,050; and 5,984,273, all of which are incorporated by reference herein in their entireties. The capstan 44 may extend from the drive frame 48 along an axis 45 which is transverse to the longitudinal axis 51 of the first arm 50 and a longitudinal axis 47 of the handle 46. Capstan 44 may be rotatably driven by the motor 42 such that it rotates about such axis 45.

A third arm 70 may be rotatably connected to the second arm 54, and may rotate relative to the second arm 54 about an axis 71 which is parallel to the axis 28 about which the boom assembly 20 generally rotates. For example, a channel bracket 80 may be fixedly connected to a proximal end 72 of the third arm 70. The channel bracket 80 may be rotatably coupled to a distal end 52 of the second arm 54 (i.e. a distal end 52 from the drive frame 48). When the third arm 70 is rotated to a position wherein the longitudinal axis 75 of the third arm 70 and the longitudinal axis 55 of the second arm 54 are parallel, the channel bracket 80 may fit over at least a portion of the second arm 54. The channel bracket 80 may thus also serve to limit such rotation so that the third arm 70 cannot rotate past such parallel position. When in such position, bore holes 58, 82 in the second arm 54 and channel bracket 80 may align, and a pin 84 may be inserted through such bore holes 58, 82 to lock the position of the third arm 70 in such parallel rotational position. Removal of the pin 84 may permit rotation.

Third arm 70 may be a single member, or may include a fixed member 90 and a movable member 92. The movable member 92 may be telescopically movable (such as along the longitudinal axis) of the fixed member 90. Fixed member 90 may include the proximal end 72 and be connected to the channel bracket 80. Movable member 92 may include a distal end 74 of the third arm 70. Movable member 92, for example, may fit within or over fixed member 90. Bore holes 91 in the movable member 92 and in the fixed member 90 may be utilized to lock the movable member 92 in a desired position relative to the fixed member 90. When in a desired position, a pin 96 may be inserted through aligned bore holes 91 to lock the position of the movable member 92 relative to the fixed member 90. Removal of the pin 96 may permit movement.

The third arm 70 may, for example, have a maximum length of between 40 inches and 60 inches and a minimum length of between 25 and 40 inches.

A fourth arm 100 may be rotatably connected to the third arm 70, such as to the distal end 74 thereof. Fourth arm 100 may be rotatable relative to the third arm 70 about an axis 102 which is parallel to the axis 28 about which the boom assembly 20 generally rotates. A joint assembly 110 may provide such rotational connection. Joint assembly 110 may include, for example, one or more brackets 112 which are coupled to the third arm 70 (such as the distal end 74 thereof) and one or more brackets 114 which are coupled to the fourth arm 100 (such as a proximal end thereof). The brackets 112, 114 may be rotationally connected at and thus rotational with respect to each other about the axis. Such rotation of the brackets 112, 114 with respect to each other facilitates rotation of the fourth arm 100 relative to the third arm 70 with respect to each other. The brackets 112 may include bore holes 113 defined therein. A pin 116 may be extended through such bore holes 113 to lock the position of the brackets 112, 114 and arms relative to each other and thus prevent rotation. Removal of the pin 116 may permit rotation.

The joint assembly 110 may further include, for example, a sheave 118 or one or more rollers. These components facilitate cable removal by providing a rotational path for the cable to follow between the conduit and the capstan 44.

Boom assembly 20 may further include a conduit-engagement device 120. In general, conduit-engagement device 120 is a device which is placed in contact with or partially within a conduit to provide guidance to cable being pulled from the conduit. A conduit-engagement device 120 may, for example, include a tube-like or channel-like (which may for example be U-shaped or tube-like with a slot 122 defined in the tube) insert member 124 through which cable may traverse during cable pulling operations.

Conduit-engagement device 120 may be rotatably coupled to the fourth arm 100, such as to a distal end 104 thereof. The device 120 may be rotatable relative to the fourth arm 100 about an axis 121 which is parallel to the axis 28 about which the boom assembly 20 generally rotates. A joint assembly 130 may provide such rotational connection. Joint assembly 130 may include, for example, one or more brackets 132 which are coupled to the fourth arm 100 (such as the distal end 104 thereof) and one or more brackets 134 which are coupled to the conduit-engagement device 120. The brackets 132, 134 may be rotationally connected at and thus rotational with respect to each other about such axis 121. Such rotation of the brackets 132, 134 with respect to each other facilitates rotation of the conduit-engagement device 120 relative to the fourth arm 100. Brackets 132, 134 may include bore holes 135 defined therein. A pin 136 may be extended through such bore holes 135 to lock the position of the brackets 132, 134 and fourth arm 100 and conduit-engagement device 120 relative to each other and thus prevent rotational. Removal of the pin 136 may permit rotation.

Joint assembly 130 may further include, for example, a plurality of rollers or alternatively a sheave 138. These components facilitate cable removal by providing a rotational path for the cable to follow between the conduit and the capstan 44.

Conduit engagement device 120 may include an insert 124 as discussed above. Insert 124 may be fixed in conduit engagement device 120, or may be removable. For example, a plate 126 may be fixedly connected to the insert 124, and the conduit engagement device 120 may further include a connection member 128 in which a slot 129 for receipt of the plate 126 may be defined. The connection member 128 may, for example, extend between the brackets 134 which are coupled to the device 120. Insert 124 may be removably coupled to the connection member 128 by insert or removal of the plate 126 into the slot 129.

A plurality of inserts 124 (each of which may include a plate 126 fixedly connected thereto) may be provided. Each insert 124 may have a different size for accommodation of a different sized cable therein. Inserts 124 which are not in use may be stored on the frame 12. For example, slots 140 may be defined in various horizontal members 24 of the frame 12, and inserts 124 which are not in use can be stored in such slots 140 via insertion of the associate plate 126 in a slot 140.

Figure 2:
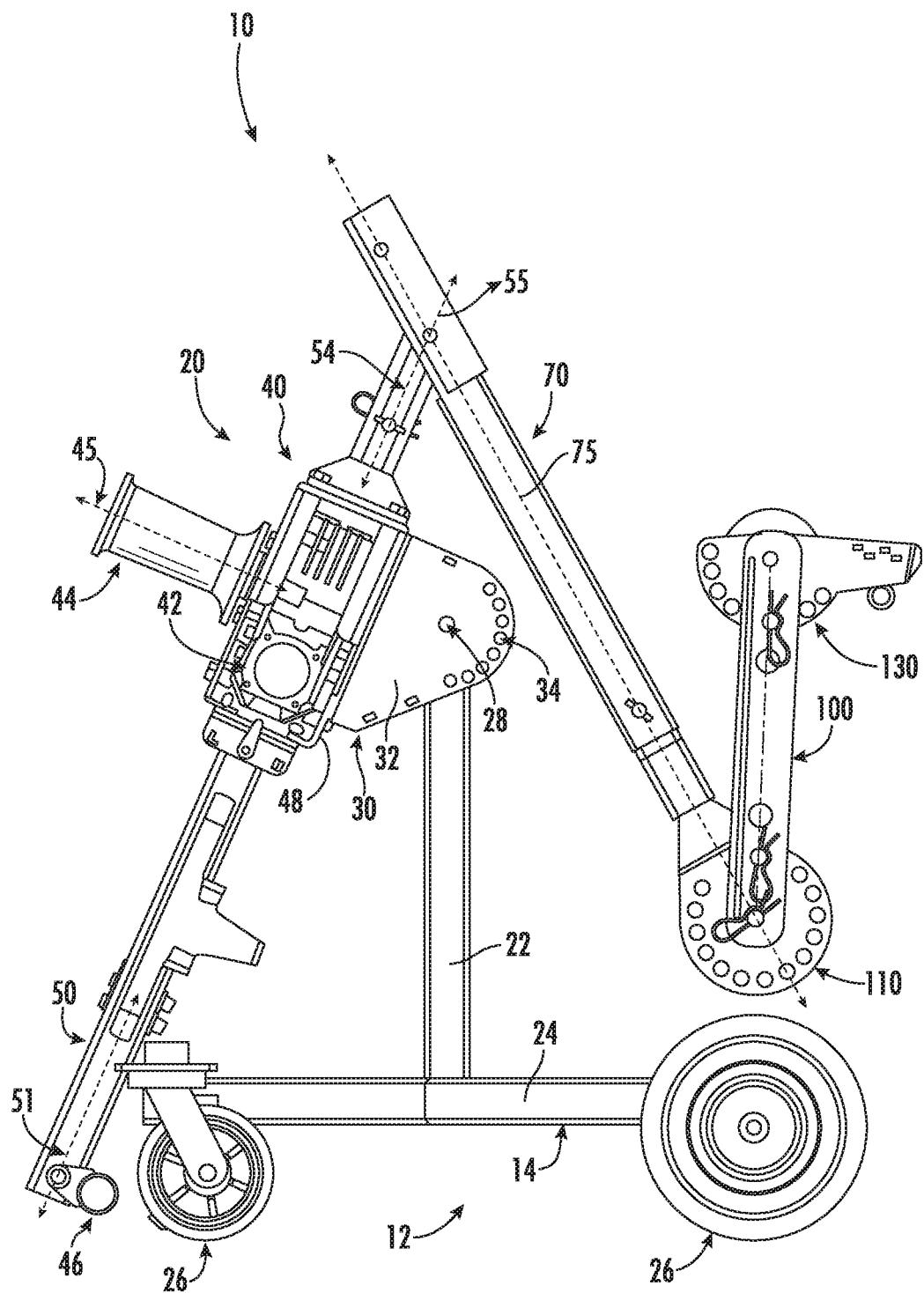
FIG. 2 is a side view of a cable puller in a transport position in accordance with embodiments of the present disclosure.
Figure 3:
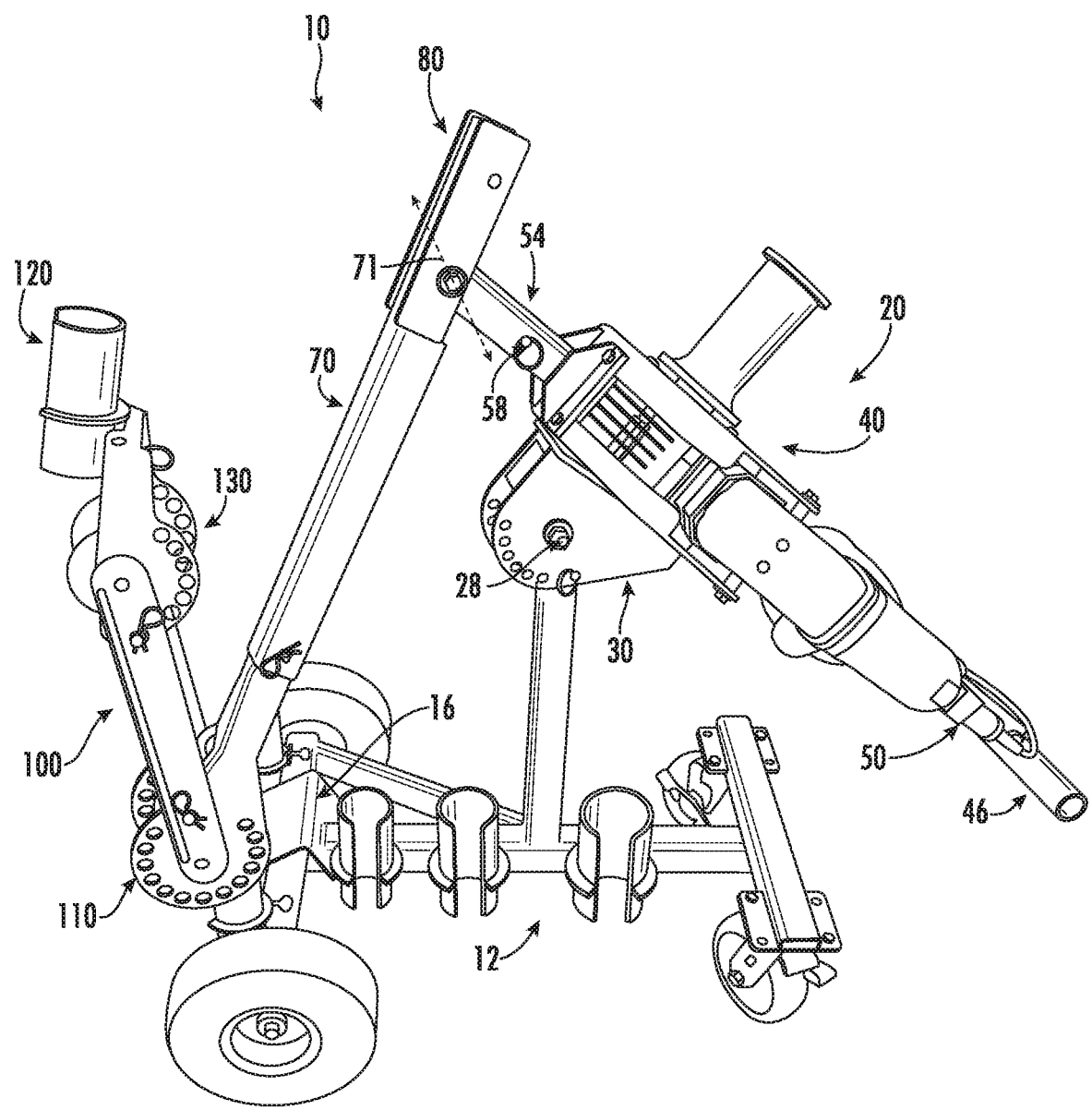
FIG. 3 is a side perspective view of a cable puller in a position between a transport position and a raised position, in accordance with embodiments of the present disclosure.
Figure 4:
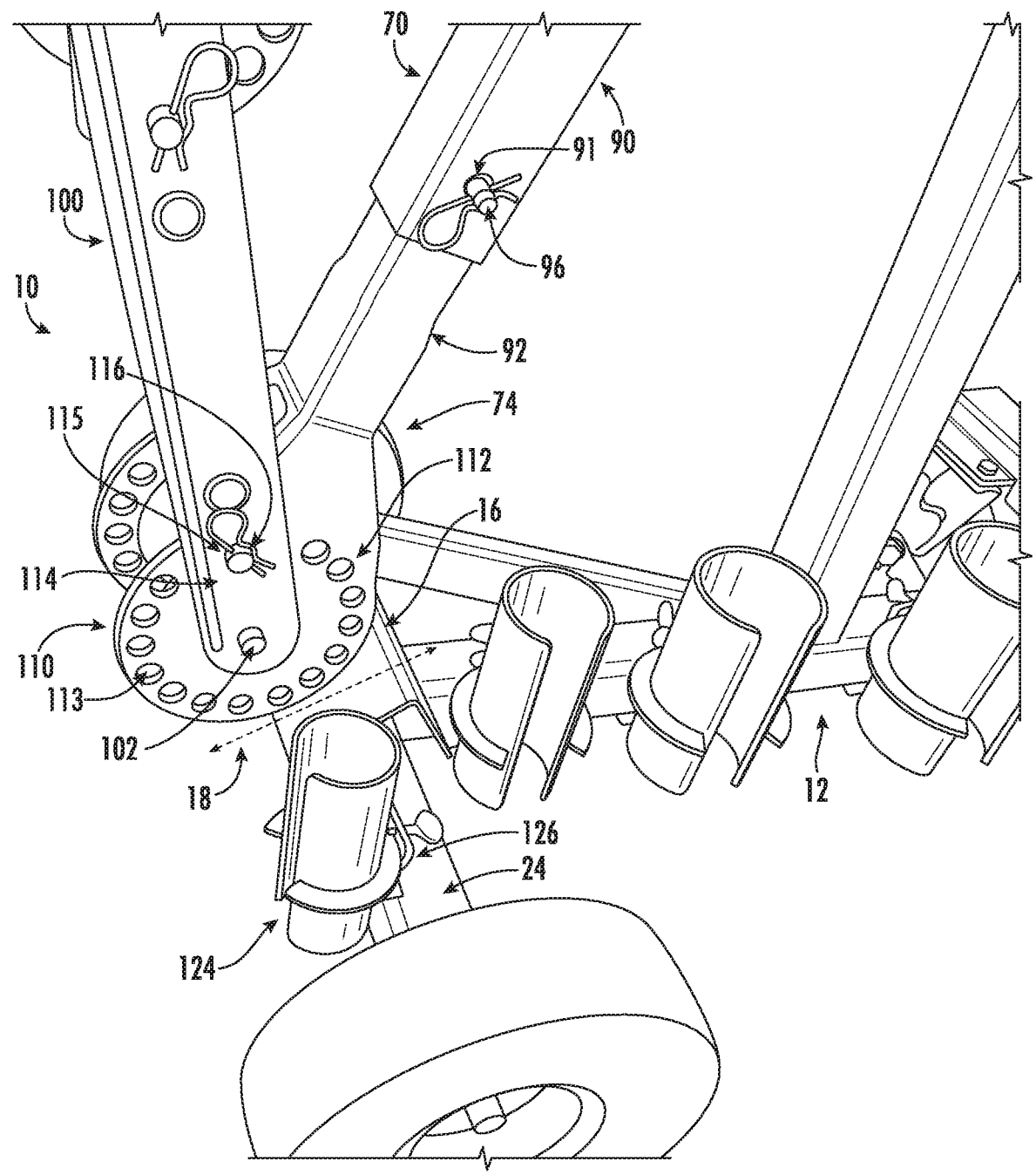
FIG. 4 is a close-up perspective view of components of a cable puller, including a joint assembly contacting a strike plate, in accordance with embodiments of the present disclosure.
Figure 5:
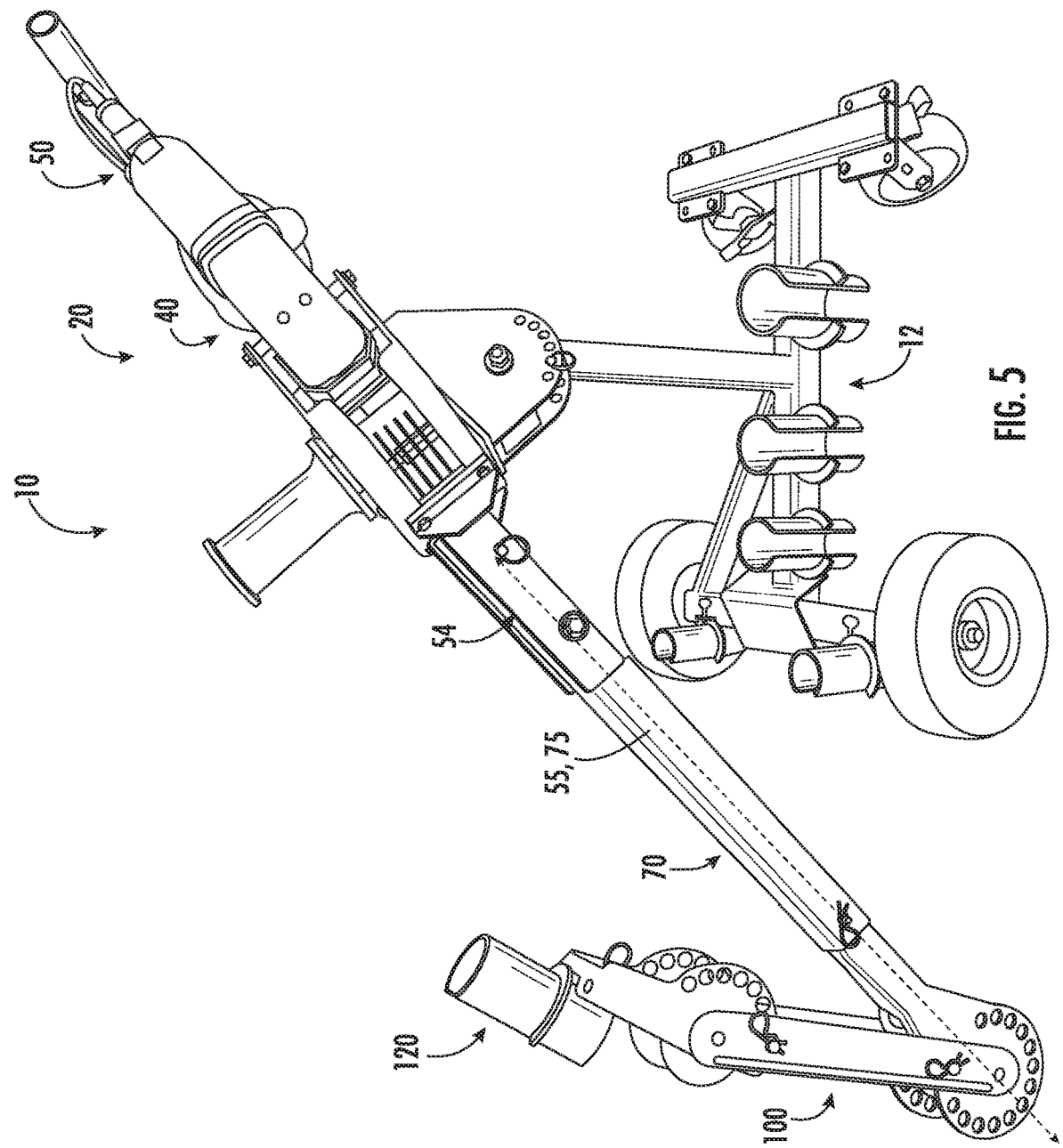
FIG. 5 is a side perspective view of a cable puller in a raised position in accordance with embodiments of the present disclosure.
Figure 6:
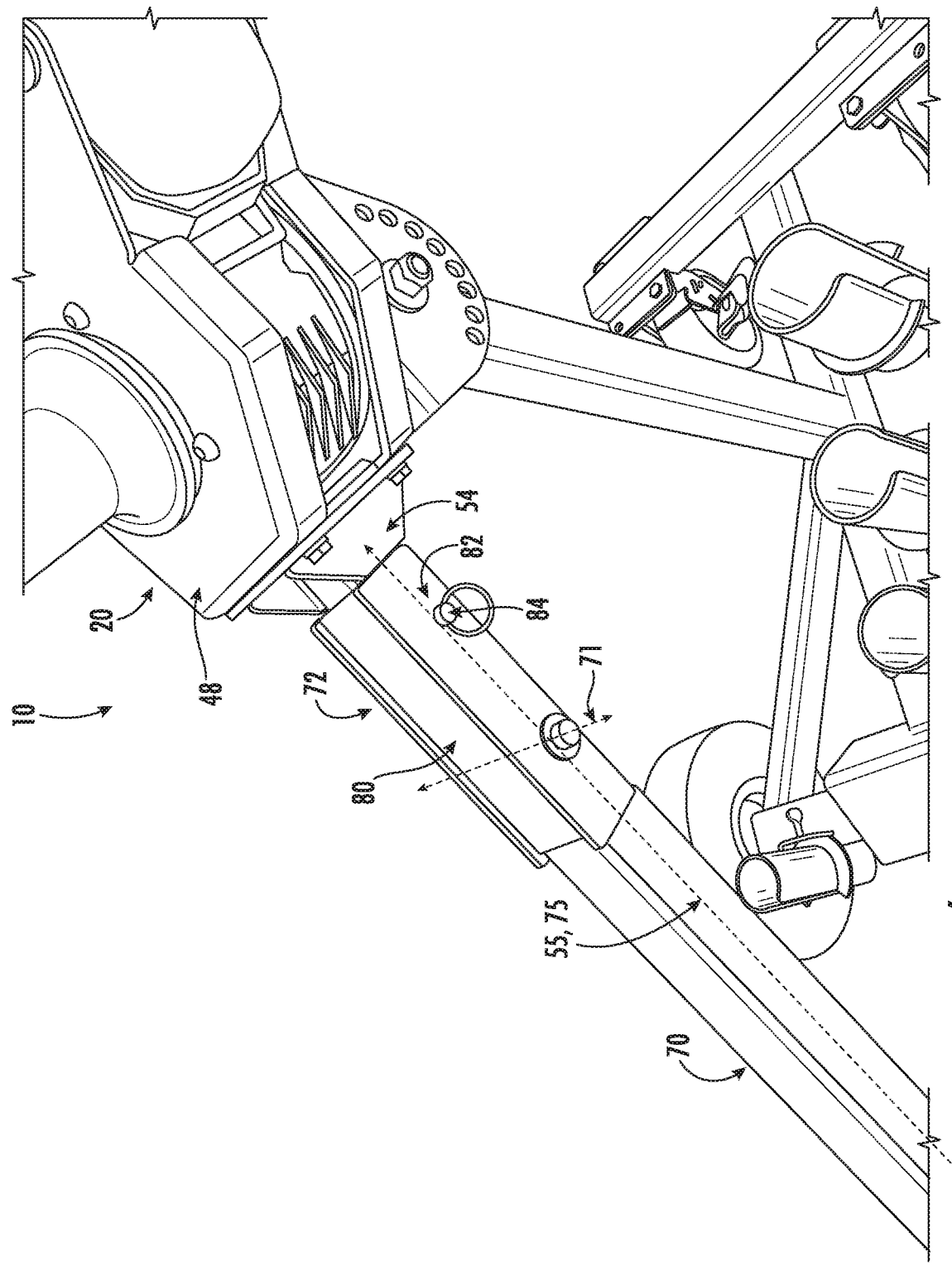
FIG. 6 is a close-up perspective view of components of a cable puller in a raised position with a longitudinal axis of a third arm and a longitudinal axis of a second arm locked in parallel, in accordance with embodiments of the present disclosure.
Figure 7:
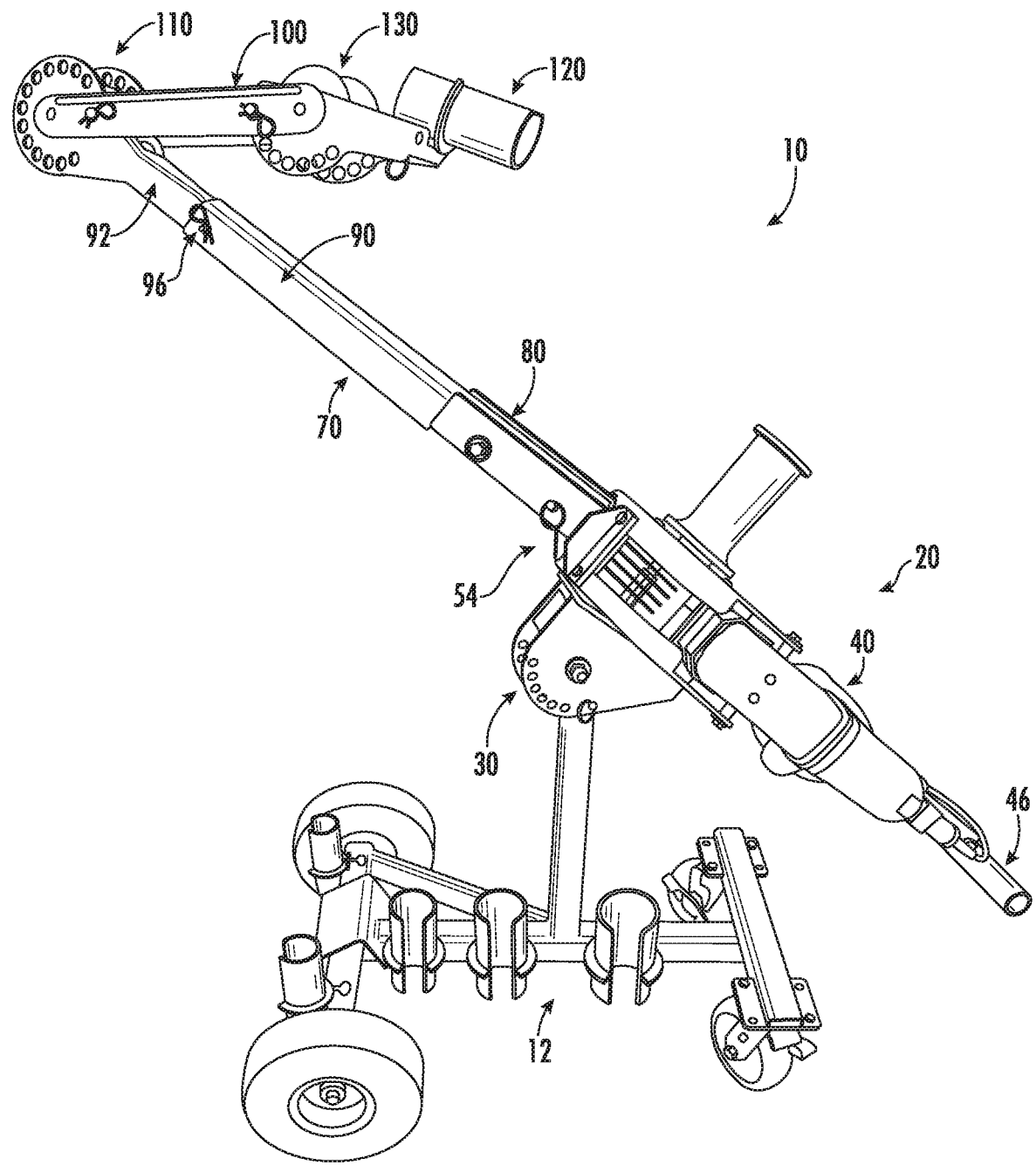
FIG. 7 is a side perspective view of a cable puller in a position different from the position of FIG. 5, in accordance with embodiments of the present disclosure.
Figure 8:
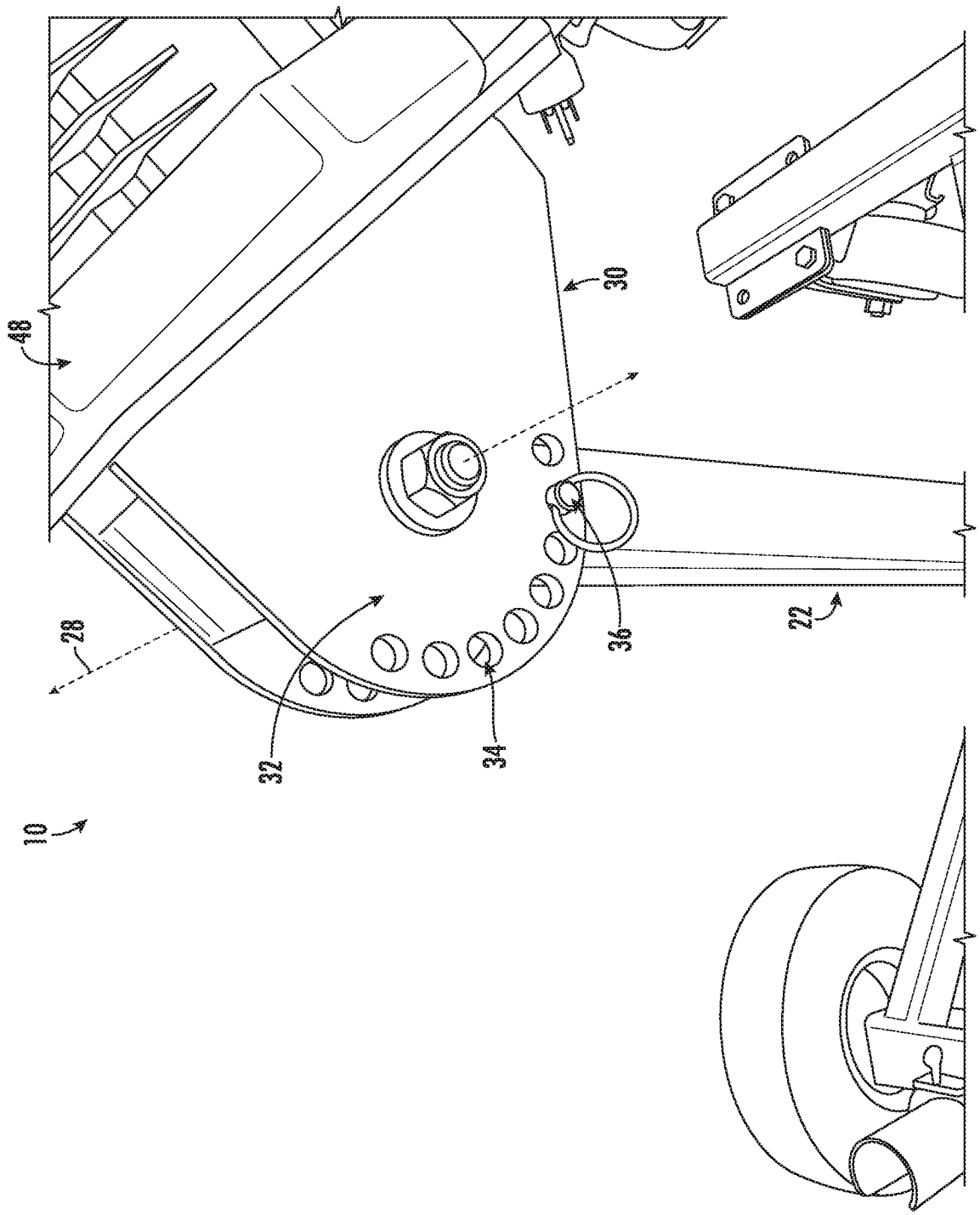
FIG. 8 is a close-up perspective view of components of a cable puller, including a bracket assembly coupling a vertical member to a boom assembly, in accordance with embodiments of the present disclosure.
Figure 9:
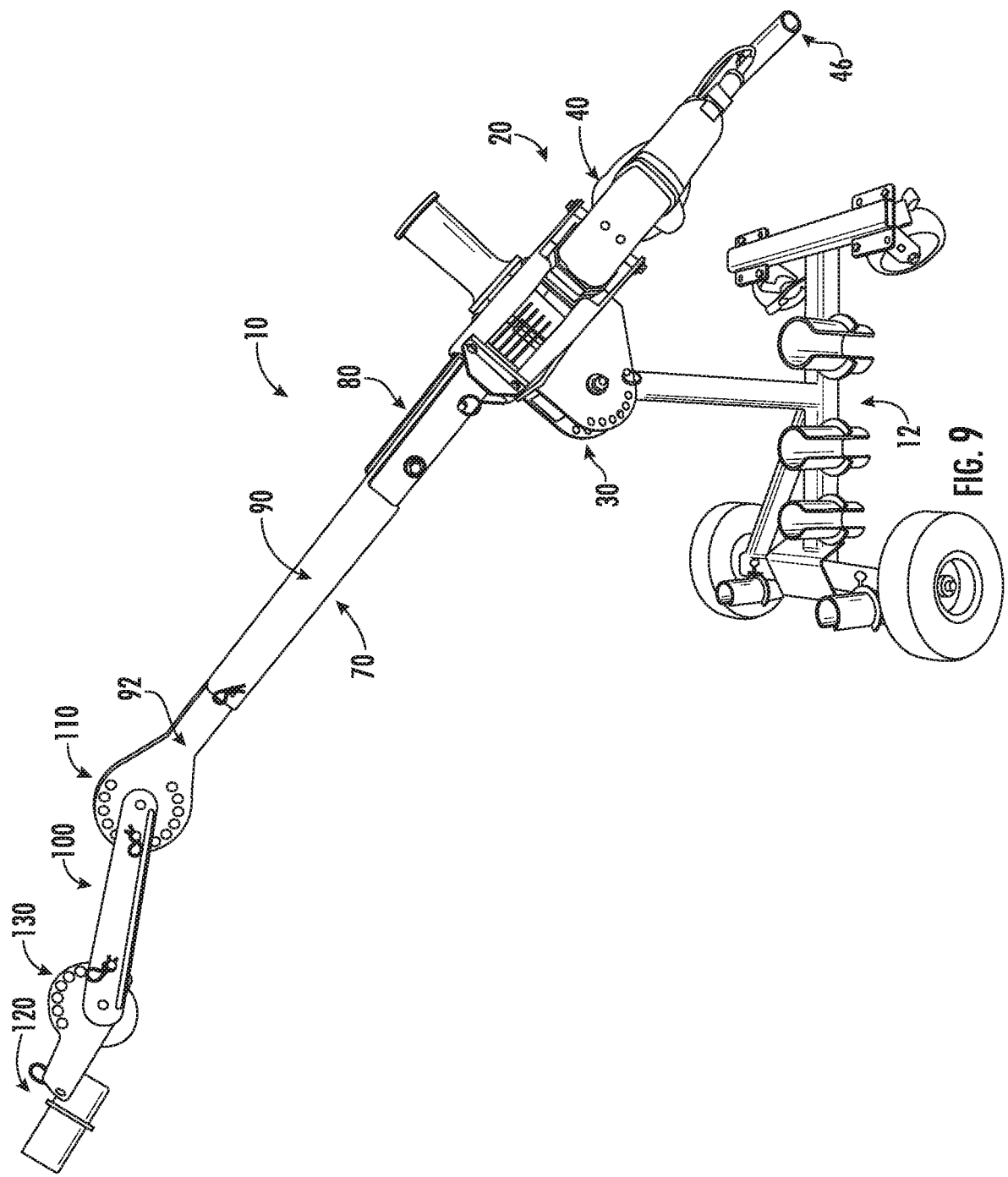
FIG. 9 is a side perspective view of a cable puller in a position different from the position of FIGS. 5 and 7 in accordance with embodiments of the present disclosure.
Figure 10:
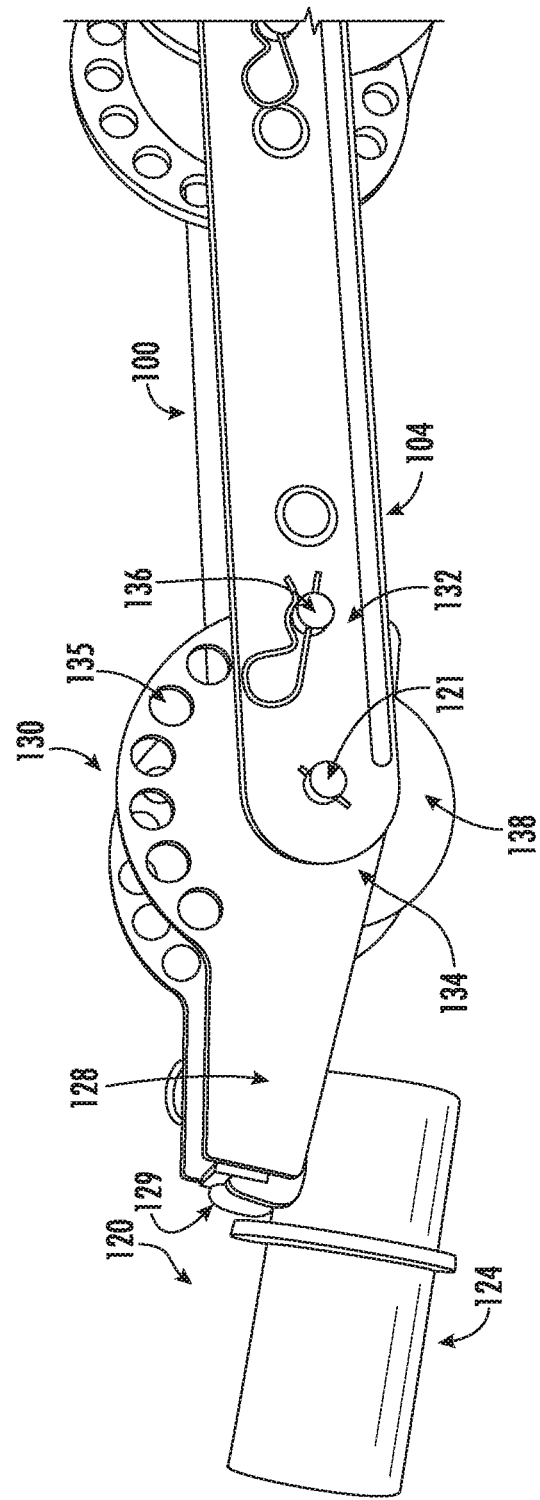
FIG. 10 is a close-up side view of components of a cable puller, including a joint assembly coupling a conduit-engagement device with a fourth arm, in accordance with embodiments of the present disclosure.
Figure 11:
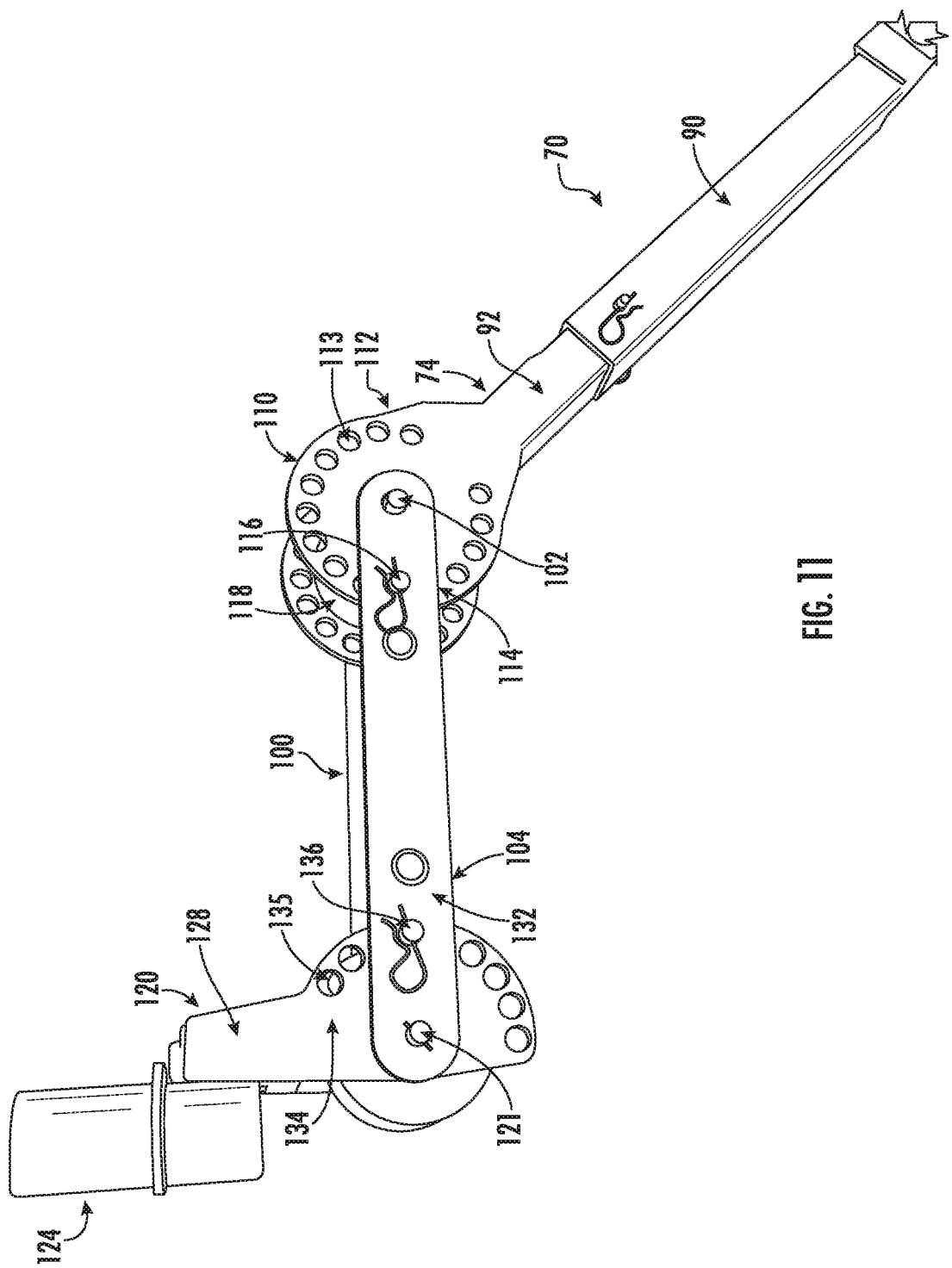
FIG. 11 is a close-up side view of components of a cable puller, with a conduit-engagement device rotated to a position different from the position of FIG. 10, in accordance with embodiments of the present disclosure.
Figure 12:
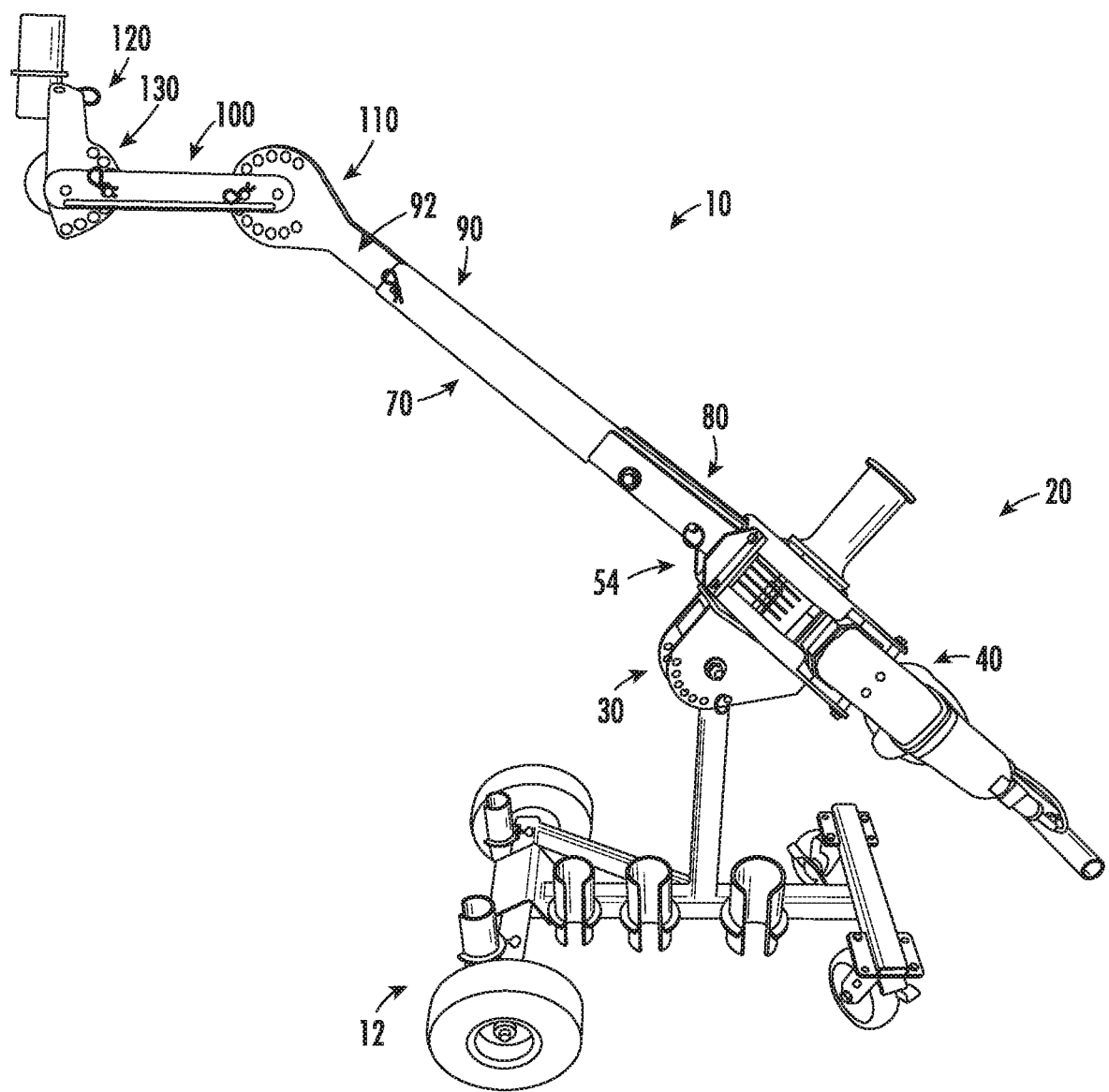
FIG. 12 is a side perspective view of a cable puller in a position different from the position of FIGS. 5, 7 and 9, in accordance with embodiments of the present disclosure.
Figure 13:
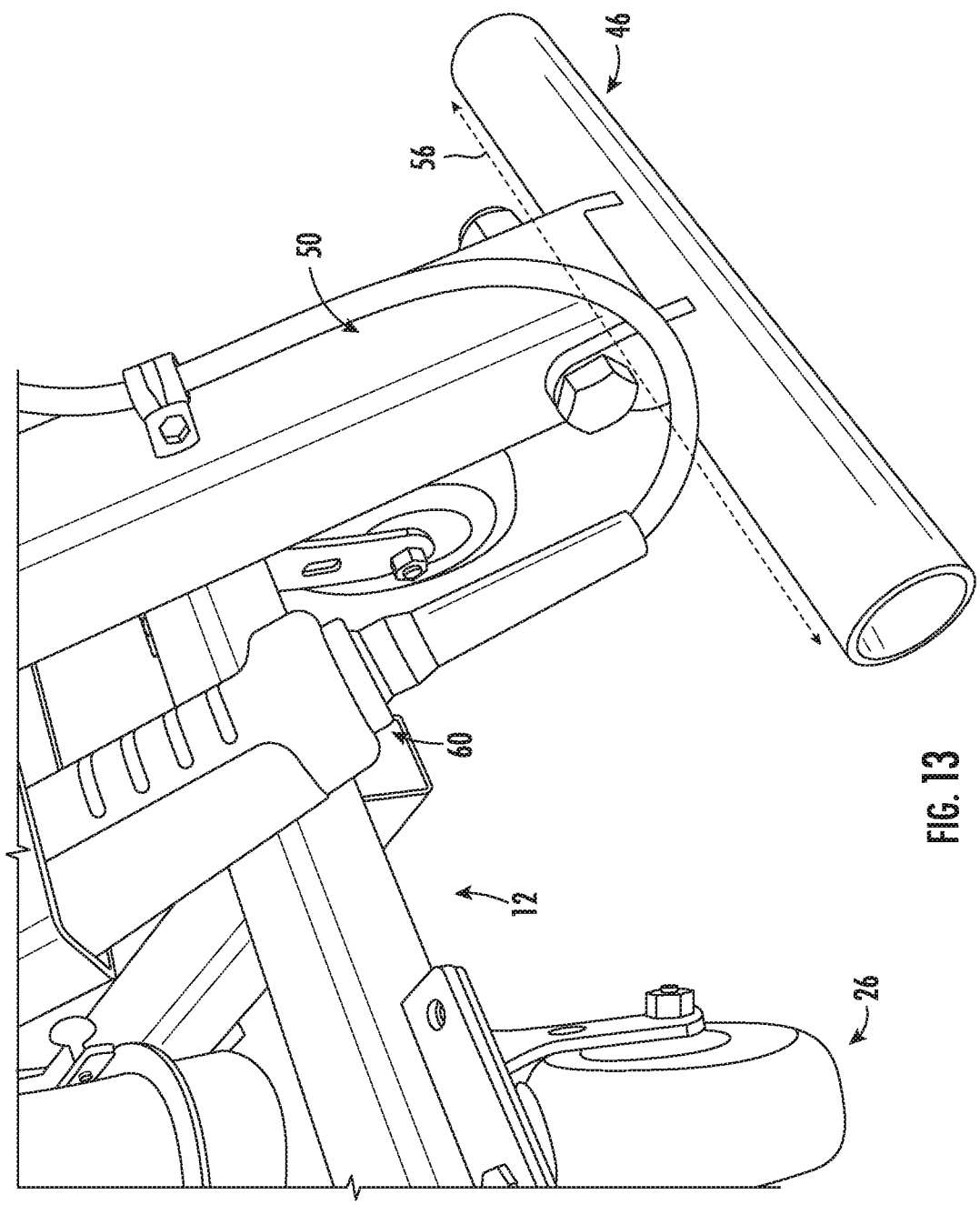
FIG. 13 is a close-up perspective view of components of a cable puller, including a handle, in accordance with embodiments of the present disclosure.
Figure 14:
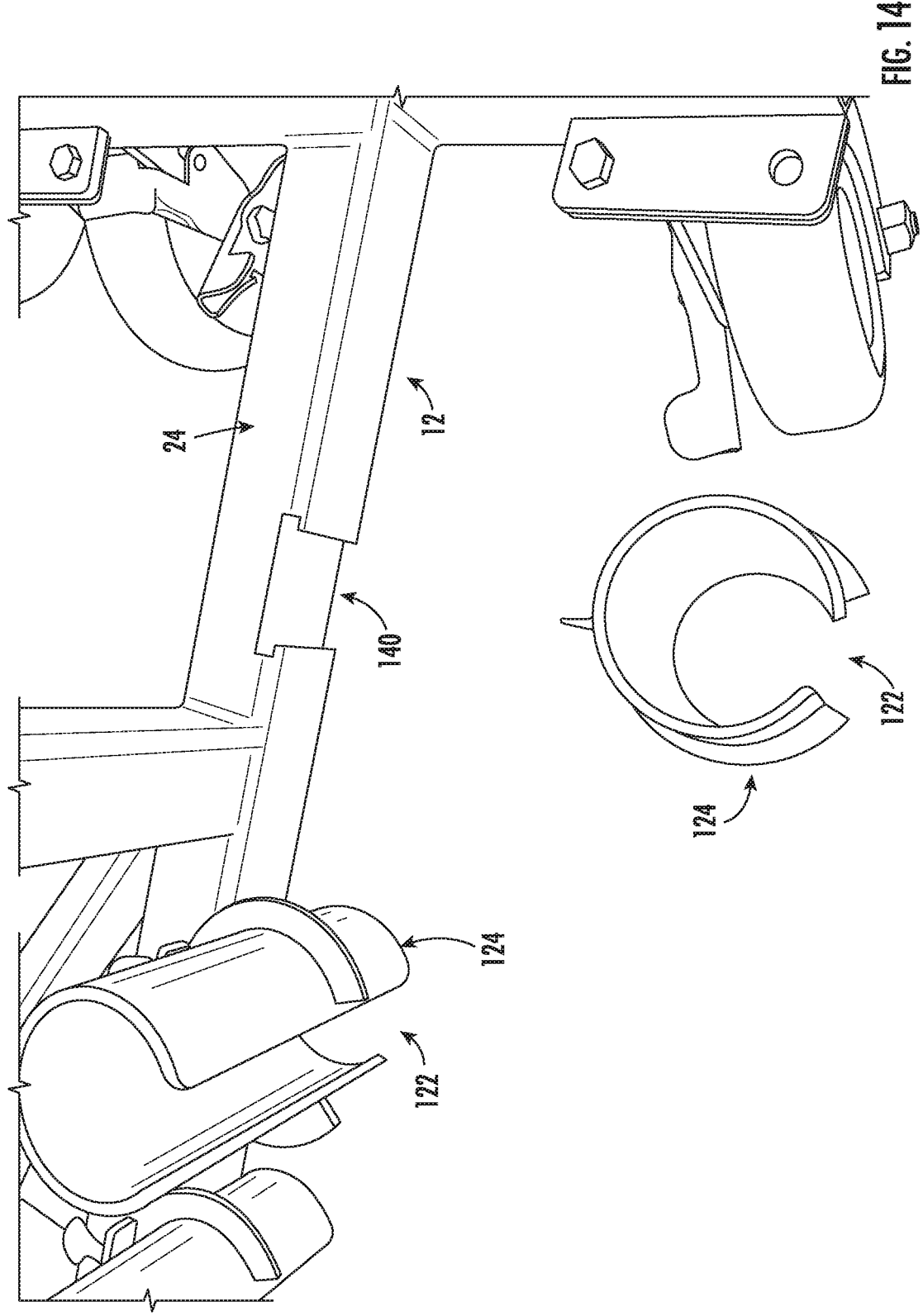
FIG. 14 is a close-up perspective view of components of a cable puller, including inserts for a conduit-engagement device, in accordance with embodiments of the present disclosure.
Figure 15:
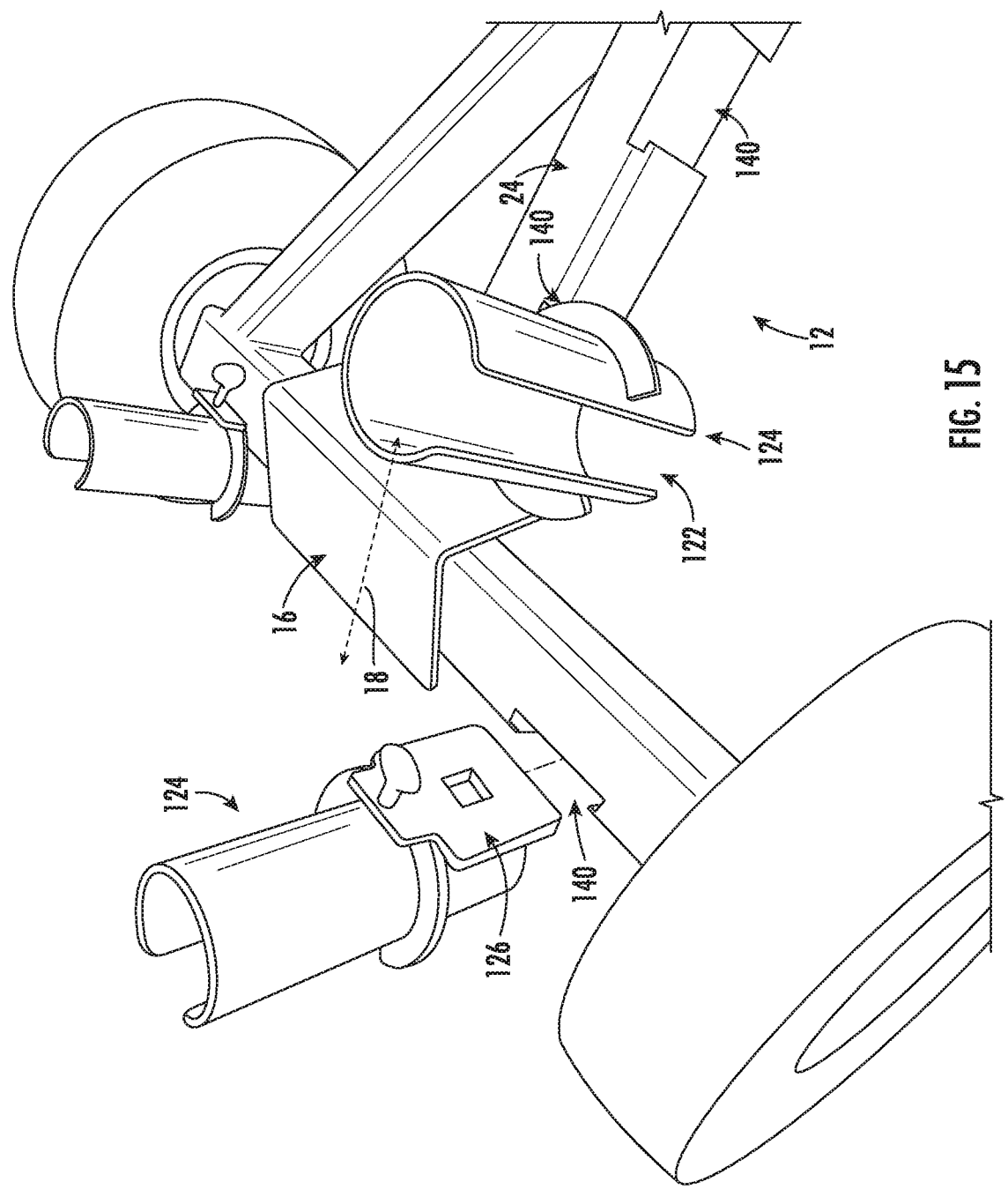
FIG. 15 is a close-up perspective view of components of a cable puller, including an insert being inserted into a frame of the cable puller, in accordance with embodiments of the present disclosure.

To deploy the puller 10 from a transport position, the drive assembly 40 may be rotated relative to the frame 12, such as for example by raising the handle 46 from a position near the ground (as shown in FIGS. 1 and 2) to a raised position (relative to the position near the ground) (as shown in FIG. 5). Such movement of the drive assembly 40 may advantageously cause the joint assembly 110 between third arm 70 and fourth arm 100 to contact the strike plate 16 and/or ground (as shown in FIG. 3), causing automatic rotation of the third arm 70 relative to the second arm 54 into the parallel position. After locking of the position of the third arm 70, drive assembly 40 and third arm 70 can then together be further rotated (such as via user rotation of the handle) (as shown in FIG. 7) as desired to an optimal position relative to a conduit. The fourth arm 100 and conduit engagement assembly 120 may then be easily and efficiently rotated into desired positions (as shown in FIGS. 9 through 12).

The lengths and positioning of the various components advantageously provide a balanced and easy to deploy cable puller 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cable puller, comprising;
   a frame; and
   a boom assembly rotatably connected to the frame, the boom assembly comprising a drive assembly, a first arm extending in a first direction from the drive assembly, a second arm extending in a second opposite direction from the drive assembly, a third arm rotatably connected to the second arm, and wherein the drive assembly comprises a handle, the handle rotatably connected to the first arm at a free distal end of the first arm, wherein rotation of the boom assembly relative to the frame causes rotation of the third arm relative to the second arm to a position wherein a longitudinal axis of the third arm is parallel with a longitudinal axis of the second arm.

2. The cable puller of claim 1, wherein the boom assembly further comprises a bracket assembly, the bracket assembly rotatably connecting the boom assembly to the frame.

3. The cable puller of claim 2, wherein the drive assembly comprises a motor, a capstan, and a drive frame, wherein the first arm and the second arm are fixedly connected to the drive frame, and wherein the drive frame is fixedly connected to the bracket assembly.

4. The cable puller of claim 3, wherein the capstan extends from the drive frame along an axis which is transverse to a longitudinal axis of the first arm.

5. The cable puller of claim 1, further comprising a channel bracket fixedly connected to a proximal end of the third arm and rotatably coupled to a distal end of the second arm, wherein rotation of the third arm relative to the second arm to the position wherein the longitudinal axis of the third arm is parallel with the longitudinal axis of the second arm causes the channel bracket to fit over at least a portion of the second arm.

6. The cable puller of claim 1, wherein rotation of the third arm relative to the second arm is limited such that the third arm cannot rotate relative to the second arm past the position wherein the longitudinal axis of the third arm is parallel with the longitudinal axis of the second arm.

7. The cable puller of claim 1, further comprising a strike plate mounted to the frame.

8. The cable puller of claim 7, wherein the boom assembly further comprises a fourth arm and a joint assembly rotatably connecting the third arm and the fourth arm, and wherein rotation of the boom assembly relative to the frame causes the joint assembly to contact the strike plate, wherein such contact causes rotation of the third arm relative to the second arm to the position wherein the longitudinal axis of the third arm is parallel with the longitudinal axis of the second arm.

9. The cable puller of claim 1, wherein the third arm comprises a fixed member and a movable member, the movable member telescopically movable relative to the fixed member.

10. The cable puller of claim 1, wherein the boom assembly further comprises a fourth arm rotatably connected to the third arm.

11. The cable puller of claim 10, further comprising a conduit-engagement device rotatably coupled to the fourth arm.

12. The cable puller of claim 11, wherein the conduit-engagement device comprises a removable insert, wherein the frame defines a slot, and wherein the removable insert is insertable into the slot.

13. A cable puller, comprising;
a frame, the frame comprising a base and a vertical member extending therefrom;
a strike plate mounted to the base; and
a boom assembly rotatably connected to the vertical member, the boom assembly comprising a drive assembly, a first arm extending in a first direction from the drive assembly, a second arm extending in a second opposite direction from the drive assembly, a third arm rotatably connected to the second arm, and a fourth arm rotatably connected to the third arm by a joint assembly, wherein rotation of the boom assembly relative to the frame causes the joint assembly to contact the strike plate, wherein such contact causes rotation of the third arm relative to the second arm to a position wherein a longitudinal axis of the third arm is parallel with a longitudinal axis of the second arm.

14. The cable puller of claim 13, wherein the boom assembly further comprises a bracket assembly, the bracket assembly rotatably connecting the boom assembly to the vertical member.

15. The cable puller of claim 14, wherein the drive assembly comprises a motor, a capstan, and a drive frame, wherein the first arm and the second arm are fixedly connected to the drive frame, and wherein the drive frame is fixedly connected to the bracket assembly.

16. The cable puller of claim 15, wherein the capstan extends from the drive frame along an axis which is transverse to a longitudinal axis of the first arm.

17. The cable puller of claim 13, further comprising a channel bracket fixedly connected to a proximal end of the third arm and rotatably coupled to a distal end of the second arm, wherein rotation of the third arm relative to the second arm to the position wherein the longitudinal axis of the third arm is parallel with the longitudinal axis of the second arm causes the channel bracket to fit over at least a portion of the second arm.

18. The cable puller of claim 13, wherein rotation of the third arm relative to the second arm is limited such that the third arm cannot rotate relative to the second arm past the position wherein the longitudinal axis of the third arm is parallel with the longitudinal axis of the second arm.

19. The cable puller of claim 13, wherein the third arm comprises a fixed member and a movable member, the movable member telescopically movable relative to the fixed member.

20. A cable puller, comprising;
a frame; and
a boom assembly rotatably connected to the frame, the boom assembly comprising a drive assembly, a first arm extending in a first direction from the drive assembly, a second arm extending in a second opposite direction from the drive assembly, and a third arm rotatably connected to the second arm,
wherein rotation of the boom assembly relative to the frame causes rotation of the third arm relative to the second arm to a position wherein a longitudinal axis of the third arm is parallel with a longitudinal axis of the second arm, and
wherein rotation of the third arm relative to the second arm is limited such that the third arm cannot rotate relative to the second arm past the position wherein the longitudinal axis of the third arm is parallel with the longitudinal axis of the second arm.

21. A cable puller, comprising;
a frame; and
a boom assembly rotatably connected to the frame, the boom assembly comprising a drive assembly, a first arm extending in a first direction from the drive assembly, a second arm extending in a second opposite direction from the drive assembly, a third arm rotatably connected to the second arm, and wherein the drive assembly comprises a handle, the handle connected to the first arm at a free distal end of the first arm,
wherein rotation of the boom assembly relative to the frame causes rotation of the third arm relative to the second arm to a position wherein a longitudinal axis of the third arm is parallel with a longitudinal axis of the second arm.

\* \* \* \* \*